United States Patent [19]

Stahel

[11] Patent Number: 4,543,264
[45] Date of Patent: Sep. 24, 1985

[54] METHOD OF TREATING OILSEED MATERIAL

[75] Inventor: Nancy G. Stahel, Minneapolis, Minn.

[73] Assignee: Land O'Lakes, Inc., Arden Hills, Minn.

[21] Appl. No.: 612,074

[22] Filed: May 21, 1984

Related U.S. Application Data

[63] Continuation-in-part of Ser. No. 410,351, Aug. 23, 1982, Pat. No. 4,450,176.

[51] Int. Cl.[4] .................................................. A23L 1/20
[52] U.S. Cl. ...................................... 426/629; 426/632; 426/467; 426/468; 426/486; 426/520
[58] Field of Search ............... 426/629, 632, 467, 468, 426/486, 520

[56] References Cited

U.S. PATENT DOCUMENTS

| | | |
|---|---|---|
| 1,541,006 | 6/1925 | Thevenot . |
| 1,606,052 | 11/1926 | Bollmann . |
| 2,444,241 | 6/1948 | Beckel et al. ............................ 99/14 |
| 2,445,931 | 7/1948 | Beckel et al. ..................... 260/412.4 |
| 2,615,905 | 10/1952 | Forstmann ........................ 260/412.4 |
| 2,635,094 | 4/1953 | Belter et al. ....................... 260/123.5 |
| 3,023,107 | 2/1962 | Mustakas et al. ......................... 99/98 |
| 3,043,826 | 7/1962 | Beaber et al. ..................... 260/123.5 |
| 3,168,406 | 2/1965 | Moshy ...................................... 99/99 |
| 3,170,802 | 2/1965 | Fukushima ............................. 99/145 |
| 3,202,084 | 8/1965 | Hale et al. .............................. 99/235 |
| 3,218,307 | 11/1965 | Eldridge et al. ................. 260/123.5 |
| 3,252,807 | 5/1966 | Kuramoto ............................... 99/90 |
| 3,268,503 | 8/1966 | Mustakas et al. ................ 260/123.5 |
| 3,721,569 | 3/1973 | Steinkraus ............................... 99/98 |
| 3,891,774 | 6/1975 | Baker et al. .......................... 426/104 |
| 3,897,574 | 7/1975 | Pass ..................................... 426/430 |
| 3,925,569 | 12/1975 | Daftary ............................... 426/634 |
| 3,970,764 | 7/1976 | Karnofsky ........................... 426/430 |
| 4,079,155 | 3/1978 | Kakade ............................... 426/634 |
| 4,113,716 | 9/1978 | Gomi et al. ...................... 260/123.5 |
| 4,132,808 | 1/1979 | Kakade .................................. 426/2 |
| 4,265,925 | 5/1981 | Campbell et al. .................. 426/641 |
| 4,318,933 | 3/1982 | Miller, Jr. ........................... 426/431 |

OTHER PUBLICATIONS

Mustakas, G. C. et al., "Flash Desolventizing Defatted Soybean Meals Washed with Aqueous Alcohols to Yield a High-Protein Product", JAOCS, vol. 39, No. 4, Apr. 1962, pp. 222-226.

*Primary Examiner*—Robert Yoncoskie
*Attorney, Agent, or Firm*—Kinney & Lange

[57] ABSTRACT

A bland and nutritive oilseed food product made from an oil seed having a fat content of at least approximately 10% and a protein content of at least approximately 20% is produced by a process involving the steps of heating a particulate oilseed material with steam to preferably 220° F. and subjecting the particulate oilseed material to lower alcohol vapors. Initially, the oilseed material is placed in a closed vessel and the alcohol is added to the oilseed material in a preferred weight ratio of approximately 9 pounds alcohol to 60 pounds oilseed material along with a small quantity of water. The vessel has agitators that agitate the oilseed material sufficiently to "fluidize" the material within the vessel. Steam is injected into the vessel and when the temperature of the oilseed material preferably reaches 220° F., the steam is stopped and the particulate oilseed material is kept at that temperature in the closed vessel for at least thirty minutes. The vessel is then vented at subatmospheric pressure, removing substantially all of the alcohol from the particulate oilseed material.

10 Claims, No Drawings

METHOD OF TREATING OILSEED MATERIAL

RELATED U.S. APPLICATION DATA

The present application is a continuation-in-part of Ser. No. 410,351, filed on Aug. 23, 1982, now U.S. Pat. No. 4,450,176.

BACKGROUND OF THE INVENTION

1. Field of the Invention

The present invention relates to the preparation of improved high-protein food products from high protein, high fat oilseeds and, in particular, it relates to a process for making the oilseed food product more digestable.

2. Description of the Prior Art

The use of alcohols as a solvent in the extraction of oil from soybeans is noted in the two volume treatise on "Soybeans and Soybean Products," edited by Markley, Interscience, 1950. In one instance, mentioned by the editor, as being described by Beckel and Smith in Vol. 16 of "Food Industries," 1944, pages 616–644, alcohol with a small proportion of water was used under pressure to extract the oil while avoiding denaturization of the protein.

More recently, in the Moshy U.S. Pat. No. 3,168,406, a process is disclosed wherein alcohol and water are used to treat soybean meal to make the soybean meal bland and odorless. The process includes mixing soybean flour with alcohol to form a slurry such that the pH is adjusted to the isoelectric range of soy proteins, that is about pH 4–6. The slurry is then heated to a temperature range of 175°–212° F. and cooked for preferably sixty minutes. The supernatant liquid is then removed from the soybean flour by any well known process and the resulting filter cake is washed a number of times with water to remove the alcohol. In one example, the filter cake was dried in a vacuum pan dryer at 28 inches of vacuum at 110° F.

In the Kakade U.S. Pat. Nos. 4,079,155 and 4,132,808, which are assigned to the same assignee as the present application, a proteinaceous soybean material is subjected to a lower alcohol vapor in a pressure chamber under superatmospheric pressure. Simultaneously, the alcohol vapors are slowly and continuously removed from the chamber to volatilize certain undesirable flavor constituents, carrying off the flavor constituents with the escaping vapors. Although the process, as disclosed in the Kakade Patents, produces a satisfactory product in terms of a bland and odorless soybean product, a considerable amount of alcohol is used. Specifically, the ratio of alcohol to soybean flour used was 33 pounds of alcohol to 60 pounds of soybean flour or approximately one part of alcohol to every two parts of soybean flour that is treated.

SUMMARY OF THE INVENTION

The present invention is an improved process for treating particulate oilseed material made from full-fat oilseeds to make the oilseed material more digestable. For purposes of the present application, full-fat oilseeds have a fat content of at least approximately 10% and a protein content of at least 20%. The process uses a small amount of alcohol and directly subjects the oilseed material to a minimal amount of steam to modify the oilseed protein.

Briefly, the process includes placing the oilseed material in a closed vessel and adding the alcohol to the oilseed material in a preferred ratio of approximately at least 9 pounds material to 60 pounds oilseed material. The vessel has suitable agitators that agitate the oilseed material sufficiently to "fluidize" the material within the vessel. Steam is injected into the vessel and through the oilseed material, heating the material to a preferred treatment temperature of approximately 220° F. The combination of the alcohol vapor and the fluidization of the oilseed material maximizes the efficient use of the alcohol in altering the structure of the protein for better digestability of the oilseed meal and extracting undesirable flavor constituents from the oilseed meal.

When the oilseed material has reached a temperature of approximately 220° F., the flow of steam to the material is stopped and the material is sustained at approximately 220° F. for approximately thirty minutes by using a suitable heat source within the vessel, such as steam within a jacket in the vessel. Minimizing direct contact of steam with the oilseed material avoids unnecessary soaking and overcooking of the oilseed material. After thirty minutes, the vessel is vented at subatmospheric pressure thereby removing substantially all of the alcohol from the oilseed material.

DETAILED DESCRIPTION OF THE PREFERRED EMBODIMENTS

The present invention employs a process which uses a minimum amount of a lower alcohol in treating a particulate oilseed material to modify the protein in the oilseed material improving its digestability without overcooking. The lower alcohols useful in the process are methyl, ethyl and isopropyl alcohols although presently ethyl alcohol is preferred. Using a minimal amount of alcohol decreases several costs including the initial purchase cost of the alcohol, the disposal of the alcohol after usage and the cost of keeping track of the amount of alcohol in the user's possession as required by government regulations. The oilseed material is preferably in the form of a flour, however, the process also works quite well on oilseed flakes before they are ground into flour.

The process may be applied to what is known as full-fat oilseeds. The full-fat oilseeds are preferably in particulate form such as cracked seeds, flakes or flour. For purposes of the present application, full-fat oilseeds are defined as oilseeds having a fat content of at least approximately 10% and a protein content of at least approximately 20% by weight. Full-fat oilseeds include, but are not limited to, soybean, rapeseed, cottonseed, peanut and flaxseed. Table 1, set forth below, includes an analysis by weight percent of the protein, fat, fiber and ash content of the above-mentioned full-fat oilseeds. It is believed that the oilseeds in Table 1 are a representative sample of full-fat oilseeds as defined in the present application and that other full-fat oilseeds not specifically mentioned are included within the present invention.

TABLE 1

| Oilseed | Nutrient[A] | | | |
|---|---|---|---|---|
| | Protein | Fat | Fiber | Ash |
| | | % | | |
| Soybean | 34.9 | 11.6 | 10.1 | 4.7 |
| Rapeseed | 30.7 | 36.1 | 12.9 | 3.6 |
| Cottonseed | 31.7 | 23.9 | 10.7 | 4.5 |
| Peanut | 28.7 | 39.3 | 3.5 | 2.3 |

TABLE 1-continued

| Oilseed | Nutrient[A] | | | |
|---|---|---|---|---|
| | Protein | Fat | Fiber | Ash |
| | % | | | |
| Flaxseed | 22.0 | 34.1 | 10.4 | 3.5 |

[A] Dry matter basis.

The process of the present invention decreases the PDI to approximately less than 10. Table 2 below shows approximate PDI levels of full-fat oilseeds prior to treatment using the process of the present invention. After treatment by the present invention the PDI level was substantially lowered for each oilseed.

TABLE 2

| Oilseed[A] | PDI |
|---|---|
| N.P. Soybeans | 90.30 |
| P. Soybeans | 4.11 |
| N.P. Rapeseed | 41.35 |
| P. Rapeseed | 8.18 |
| N.P. Cottonseed | 54.32 |
| P. Cottonseed | 6.59 |
| N.P. Peanut | 36.18 |
| P. Peanut | 8.41 |
| N.P. Flaxseed | 91.06 |
| P. Flaxseed | 6.07 |

[A] N.P. = non-processed, P = processed.

The PDI is useful as a measure of the denaturization that occurs in the protein that alters the structure of the protein molecule resulting in the oilseed material being more digestable. As the PDI is decreased, the denaturization of the protein is increased. It is believed that the molecular structure of the oilseed protein is so changed that it can be more readily attacked by the enzymes and microorganisms of the digestive system.

Initially, the oilseed material is contained within a closed vessel having an agitator. The material is continuously agitated such that the material within the bed is "fluidized".

In a preferred process as is discussed further in a subsequent example, the vessel used to treat the oilseed material is a commercially available reactor, known as "DVT", manufactured by Littleford Bros., Inc. of Florence, Kentucky. The reactor has a central shaft with plough-shaped blades and at least one additional agitator, positioned on an inner wall of the vessel rotating at a higher speed than the central shaft with plough-shaped blades. The combined rotation of the agitators and ploughs and the speed at which they are rotated "fluidize" the oilseed material within the reactor.

A pressure of approximately 15 PSI to 26 PSI is used within the vessel in treating the oilseed material. In a preferred system, ethyl alcohol is initially present along with a minor amount of water with the oilseed material. Live steam is introduced in a suitable manner into the vessel, heating the proteinaceous oilseed material and vaporizing the alcohol and water such that the oilseed material is placed in intimate contact with the alcohol vapor. Sufficient amounts of live steam are injected into the vessel to bring the temperature of the oilseed material to preferably 220° F. and then the steam is turned off.

Through experimentation, it has been determined that the desirable amount of alcohol that should be used is 9 pounds of alcohol to every 60 pounds of oilseed material. Substantially less alcohol such as 6 pounds does not sufficiently treat the oilseed material. Although 9 pounds of alcohol to 60 pounds of oilseed material is a preferable ratio, more alcohol can be used to obtain a satisfactorily treated oilseed material and greater ratios of alcohol are includable within the present invention. However, greater ratios of alcohol increase the cost of treating the oilseed material.

The vessel containing the oilseed material is preferably a jacketed vessel having a suitable heating medium such as steam supplied into the jacket. The heat from the jacket sustains the oilseed material at approximately 220° F. during the course of treating the material with the alcohol vapors while minimizing direct contact of the oilseed material with steam. The oilseed material is sustained at 220° F. for approximately at least thirty minutes which allows sufficient time for the alcohol.

The previously-mentioned requirements are subject to some variation depending upon the temperature and the time the oilseed material is treated with the alcohol. For example, if 240° F. was used to treat soybean material, then the soybean material would be held at approximately 240° F. for approximately 5 minutes. It has been found that the top temperature that can be used to treat the soybean material without detrimental effects to the material is approximately 280° F. with no hold time. Once the temperature reaches 280° F., the treatment with alcohol is stopped as discussed subsequently in Example 2. Exceeding the temperature and time constraints generally results in a burned product that is grainy and brown in color. It has also been found that proteinaceous soybean material treated at 190° F. for any length of time produces an unacceptable product. An acceptable product is reached at approximately 200° F. and a product having preferred qualities achieved at a treatment temperature of at least 215° F. for at least thirty minutes. However, in all cases in processing the various full-fat oilseed, the process parameters are so selected as to reduce the PDI to well below the initial value, and generally to a final value of no higher than 10.

After the oilseed material has been sufficiently treated with the alcohol vapors, the vessel is vented to a vaccum environment, preferably 25-26 inches Hg with a vacuum pump. At 25-26 inches of Hg, water boils at approximately 126° F. The oilseed material is kept at preferably approximately 130° F. and no higher than 135° F. to remove the alcohol vapor without browning the oilseed material. A preferred temperature range during venting to remove the alcohol from the oilseed material is approximately 125° F. to 130° F.

The low PDI value of less than 10, obtained in oilseed materials processed in accordance with the present invention, makes possible the preparation of a high protein concentrate with minimal loss of protein values. Simple water extraction may be used to remove the water-soluble and non-nutritive carbohydrate components without appreciable loss of the protein. The result after drying in the case of soybean material is a concentrate containing at least about 70% of total protein by Kjedahl Nitrogen, Association of Official Analytical Chemists, method 2.057, 1980, 13th Edition. The high protein content renders the product particularly attractive as a food supplement. The food supplement is especially useful in the feeding of young domestic animals, ruminant or otherwise, which employ monogastric digestion, e.g., calves. The product obtained through the process of the present invention when combined with other materials, i.e., a fluid mixture of soybean flour and other materials in water, when fed to calves or other young domestic animals, provides a significant increase in the growth rate of the animal as compared with that obtained with milk substitutes prepared from conventionally heat-treated soybean products.

The following examples are illustrative only and are not intended to limit the present invention. The examples are submitted in order to demonstrate more explicitly the process of the present invention.

EXAMPLE 1

In a pilot plant process, 60 pounds of a commercially defatted soybean flour having a PDI of approximately 90 is loaded into a commercially available reactor known as a "DVT-130-(1-Z) Polyphase Reactor" manufactured by the Littleford, Bros., Inc. of Florence, Kentucky having a generally horizontal agitator with plough-type blades and at least one other agitator, referred to as a "chopper". The soybean flour is mixed in the reactor with 9 pounds of type 3A alcohol (a specially denatured ethyl alcohol—90% ethanol, 5% methanol and 5% water) and 6 pounds of water. The reactor is then sealed off and the alcohol and water are mixed with the soybean flour using the agitators of the reactor. The agitators in the reactor are turned on and the mixture is blended for approximately 5 minutes. After 5 minutes, steam is turned on into the jacket of the reactor to bring the product temperature to approximately 125° F. The agitators in the reactor "fluidize" the material for better contact with the alcohol. At approximately 125° F., a valve is opened and steam is injected directly into the "fluidized" soybean flour/alcohol mixture until the temperature of the flour/alcohol mixture reaches 220° F. At approximately 220° F., the steam injection is stopped and the flour/alcohol mixture is held within the reactor for approximately 30 minutes. The flour/alcohol mixture is held at a pressure range of 15 psi to 26 psi within the reactor. If the flour/alcohol mixture temperature starts to fall, steam is introduced once again into the jacket of the reactor to hold the temperature at approximately 220° F. for the 30 minutes. Alternatively, if the flour/alcohol mixture temperature rises, cold water is introduced into the jacket to bring the temperature down to 220° F. After approximately 29 minutes, the agitators are turned off and the flour/alcohol mixture is allowed to settle. At the end of the 30 minute period, the reactor is slowly vented to 25–26 inches Hg of vacuum by a conventional vacuum pump. Slow venting prevents the drawing off of excess product into the vacuum lines. After venting, the agitator with the plough-type blades is turned on and the temperature is allowed to fall to approximately 130° F. At approximately 26 inches of mercury the boiling point of water is 126° F., and the boiling point of ethyl alcohol is 95° F. By maintaining the reactor temperature at 125°–130° F., all of the alcohol is removed from the product and most of the water is removed. After approximately 25–30 minutes of drying, the agitator with the plough is turned off along with the vacuum and the product removed from the reactor and processed further into an animal food supplement. The flour has a generally bland taste with substantially no soybean odor, and a generally white non-grainy appearance having water retentive properties.

Feeding tests were conducted on calves, in which the calves were fed three types of milk replacer. The first type (A) was an all milk replacer whose source of protein was whey and casein. The second type (B) included soybean material prepared using conventional heat treating of the soybean flour and having a PDI of approximately 20. The third type (C) included soybean material processed in accordance with the present invention. In each case, the protein source was mixed with other common nutrients such as whey, animal or vegetable fat, vitamins, and minerals. The protein source was mixed with the nutrients in approximately the ranges of 26–27% protein source, 22–23% fat based powder, 45–48% whey and 1½% vitamins and minerals. This mixture was then mixed with water to form a milk-like substance which was fed to the animals. In each instance, the test extended for 28 days.

Table 3 below shows the gain in weight, in lbs., during the tests. Each column represents one 28 day test with the last column, titled "OVERALL", indicating the average of the five tests for each type of replacer. A normalized percentage is given in parentheses in the last column, with the all milk replacer being used as a base of 100% for comparing overall results. As can be seen, the replacer using protein material processed in accordance with the present invention is quite close to an all milk replacer.

TABLE 3

| REPLACER | Weight Gain in Pounds in 28 Days | | | | | OVERALL AVERAGE | (%) |
| --- | --- | --- | --- | --- | --- | --- | --- |
| | TEST | | | | | | |
| | 1 | 2 | 3 | 4 | 5 | | |
| A | 34.9 | 26.9 | 15.9 | 32.3 | 21.1 | 26.2 | (100%) |
| B | 23.6 | 20.3 | 15.5 | 16.5 | 13.5 | 17.9 | (68.3%) |
| C | 30.5 | 26.9 | 19.4 | 24.1 | 18.1 | 23.8 | (90.8%) |

Table 4 shows the replacer consumption per calf for 28 days for the trials conducted in Table 3 and indicates that the calves in the test ate approximately the same amount of milk replacer.

TABLE 4

| REPLACER | Replacer Consumption - Pounds Per 28 Days Per Calf | | | | | OVERALL AVERAGE |
| --- | --- | --- | --- | --- | --- | --- |
| | TEST | | | | | |
| | 1 | 2 | 3 | 4 | 5 | |
| A | 46.55 | 46.23 | 40.03 | 47.68 | 36.82 | 43.46 |
| B | 44.10 | 44.04 | 43.91 | 43.75 | 34.28 | 42.02 |
| C | 46.92 | 47.80 | 45.35 | 47.76 | 38.48 | 45.26 |

Table 5 shows the effect on the health of the calves in the trials of the three types of milk replacers. The numbers in each column represent a scour score for the 28 days with normal=1; loose=2; watery=3; and blood or mucus=4. As indicated by the overall average, the replacer using soy material made in accordance with the present invention results in the calves being in a more normal health state than the other types of replacers.

TABLE 5

| REPLACER | Scour Score for 28 Days | | | | | OVERALL AVERAGE |
| --- | --- | --- | --- | --- | --- | --- |
| | TEST | | | | | |
| | 1 | 2 | 3 | 4 | 5 | |
| A | 1.38 | 1.37 | 1.51 | 1.31 | 1.27 | 1.37 |
| B | 1.29 | 1.31 | 1.36 | 1.32 | 1.29 | 1.31 |
| C | 1.25 | 1.20 | 1.21 | 1.16 | 1.21 | 1.21 |

EXAMPLE 2

The procedure of Example 1 was repeated, except that live steam was injected into the reactor until the flour/alcohol mixture temperature reached 280° F. At that time, the steam injection was turned off along with the agitators and the vessel vented. The temperaure of the flour/alcohol mixture was allowed to fall to approximately 130° F. for drying. A flour having a generally bland taste with substantially no soybean odor, and a generally white non-grainy appearance with water retentive properties was produced.

EXAMPLE 3

The procedure of Example 1 was followed, except that steam injection into the reactor was continued until the flour/alcohol mixture reached approximately 240° F. At approximately 240° F., the steam injection was turned off along with the chopper and the product held for approximately 5 minutes with the plough-type blade agitator mixing the product for the 5 minutes. At the end of the 5 minute hold period, the reactor is vented as in example 1 and the temperature allowed to fall to approximately 130° F. A flour having a generally bland taste with substantially no soybean odor, and a generally white non-grainy appearance with water retentive properties was produced.

EXAMPLES 4–8

Trials using various ratios of alcohol with respect to soybean material were performed using the conditions and procedures of Example 1. The amounts of alcohol tried were 3 pounds, 6 pounds, 9 pounds, 18 pounds and 27 pounds with 60 pounds of soybean flour. The soybean flour treated in the trials with 9, 18, and 27 pounds of alcohol to 60 pounds of soybean material exhibited similar band characteristics in gel electrophoresis as the material in Example 1. The soybean flour treated in the trials using 3 and 6 pounds of alcohol did not exhibit similar band characteristics in gel electrophoresis as the material tested in Example 1. From Examples 4–8, it is understood that at least approximately 9 pounds of alcohol with 60 pounds of soybean material must be used to treat the soybean material satisfactorily using the process of the present invention. Although the levels of alcohol between 6 and 9 pounds were not specifically tested, it is also understood that soybean material treated with amounts of alcohol between 6 and 9 pounds per 60 pounds of soybean material, that exhibits band characteristics in gel electrophoresis which are similar to the material tested in Example 1, is within the scope of the present invention.

EXAMPLES 9–13

Soybeans, rapeseeds, cottonseeds, peanuts and flaxseeds were coarsely ground and were processed using the conditions and procedures of Example 1. The processed soybean, rapeseed, cottonseed, peanut and flaxseed material had a reduced PDI value as shown in Table 2.

Each of the processed oilseeds were subjected to three trials to determine improved digestability of the oilseed material.

Trial 1

In the first trial, a well known, non-digestable bag technique was used to determine the disappearance (or digestability) of a nutrient by placing the nutrient in a Dacron bag which is then placed into the rumen of a cow. Ruminal microflora capable of degrading protein and carbohydrate are able to penetrate the Dacron walls of the bags containing the oilseed material. However, the pore size of the bags is sufficiently small to prevent the sample from being flushed out of the bag. Disappearance of a nutrient (protein) contained within the oilseed material is measured and contrasted with a control. Non-processed oilseeds served as the control for each respective oilseed.

Ruminal degradation rate and extent of degradation of non-processed and processed oilseeds is presented in Table 6 below. Percentages are on a weight basis. Degradation rate is described in terms of weight percent digested per unit of time and extent of degradation is described as a weight percent remaining after 24 residence time in the rumen.

TABLE 6

| Sample[A] | Protein Degradation[B] | | Extent, % of Non-Processed Sample |
|---|---|---|---|
| | Rate, %/hr.[C] | Extent, % of initial | |
| N.P. Soybean | 18.02 | 88.4 | |
| | | | 69.7 |
| P. Soybean | 6.46 | 61.6 | |
| N.P. Rapeseed | 6.02 | 74.0 | |
| | | | 78.6 |
| P. Rapeseed | 5.00 | 58.2 | |
| N.P. Cottonseed | 8.83 | 78.2 | |
| | | | 62.5 |
| P. Cottonseed | 3.00 | 48.9 | |
| N.P. Peanut | 7.96 | 93.1 | |
| | | | 37.2 |
| P. Peanut | 1.93 | 34.6 | |
| N.P. Flaxseed | 4.47 | 66.8 | |
| | | | 72.2 |
| P. Flaxseed | 2.60 | 48.2 | |

[A]N.P. = non-processed, P. = processed
[B]Rate determined by regressing the ln of N remaining (y) on time in the rumen (x). Extent determined using the equation of Miller (1980).
[C]Rate is a mean value.

Rate of protein degradation per hour was much reduced for each processed oilseed and extent of protein degradation over 24 hour period was also considerably reduced for processed oilseeds, compared to non-processed oilseeds. Reduction of degradation is important since the availability of oilseed protein to ruminal microdigestion is reduced. It is believed by reducing the amount of protein degradation in the rumen, more oilseed protein is available to the small intestine for subsequent absorption. This is desirable because a non-degraded protein concentrate is of a generally higher quality than a microbidegraded protein and is more efficiently utilized by the animal. There is considerable scientific literature that suggests improved performance of young growing cattle and lactating dairy cows which are fed a protein that is resistant to microbiodegration in the rumen.

Trial 2

The second trail included an in-vitro ammonia-N release test which also measures the resistance of proteins to ruminal microdegradation. Each of the oilseeds was innoculated in rumen fluid and liquid buffer (simulating the ruminal environment) for four hours. At the end of this period, ammonia-N release was measured. Non-processed oilseeds served as the control for the corresponding processed oilseed material. Results of the trial are shown in Table 7 below.

TABLE 7

| Protein Source[A] | $NH_3$—N (mg/200 ml) | Processed Sample as a % of Non-Processed Sample |
|---|---|---|
| N.P. Soybean | 19.3 | |
| | | 42.5 |
| P. Soybean | 8.2 | |
| N.P. Rapeseed | 18.1 | |

TABLE 7-continued

| Protein Source[A] | NH$_3$—N (mg/200 ml) | Processed Sample as a % of Non-Processed Sample |
|---|---|---|
| | | 60.8 |
| P. Rapeseed | 11.0 | |
| N.P. Cottonseed | 23.6 | |
| | | 76.3 |
| P. Cottonseed | 18.0 | |
| N.P. Peanut | 20.9 | |
| | | 76.3 |
| P. Peanut | 6.8 | |
| N.P. Flaxseed | 22.5 | |
| | | 41.8 |
| P. Flaxseed | 9.4 | |

[A]N.P. = non-processed, P. = processed.

The data in Table 7 clearly show that the processed oilseeds are more resistant to degradation it is believed that resistance to degradation is due to reduced solubility in the rumen. The processed oilseeds exhibited an average of 51% less degradation than the non-processed material.

Trial 3

The third trial included a turkey poult study to measure the performance of young growing animals using the processed oilseeds of Examples 9–13. The non-processed oilseeds were used as a control. Groups of young turkey poults were either fed non-processed oilseeds or processed oilseeds. The oilseeds comprised one-third of the dietary protein fed to the turkey poults. The oilseed material was fed as part of a mixture that included a corn-soy based feed with the respective oilseed (processed or non-processed) replacing part of the soybean meal and corn feed. One week old turkey poults were used in this trial and all birds had free access to feed and water. The results are set forth below in Table 8. Performance data collected included average weekly gain, average weekly feed intake and a feed efficiency factor which is calculated by dividing the intake by the gain. The lower the number value of the efficiency factor, the better the efficiency.

TABLE 8

| | Poult Performance | | |
|---|---|---|---|
| Oilseed | Gain, g[A] | Intake, g[AB] | F/G |
| N.P. Soybean | 315.3 | 646.0 | 2.05 |
| P. Soybean | 479.5 | 814.3 | 1.69 |
| N.P. Rapeseed | 423.0 | 747.8 | 1.76 |
| P. Rapeseed | 443.2 | 763.2 | 1.73 |
| N.P. Cottonseed | — | — | — |
| P. Cottonseed | 432.8 | 761.9 | 1.76 |
| N.P. Peanut | 424.4 | 582.7 | 1.69 |
| P. Peanut | 393.4 | 690.2 | 1.75 |
| N.P. Flaxseed | — | — | — |
| P. Flaxseed | 351.9 | 709.8 | 2.01 |

[A]Grams per week.
[B]Expressed in grams of dry matter.

In all of the trials, with the exception of peanuts, the birds fed the non-processed oilseeds exhibited greater gain, improved intake of feed and a better efficiency rating. In the cottonseed and flaxseed portion of the trials, the birds fed non-processed cottonseed and flaxseed all died before the trials' end. No deaths were encountered in feeding the cottonseed and flaxseed processed by the present invention. It is believed that anti-nutritional factors present in these oilseeds were removed using the process of the present invention. Although the birds fed with the processed peanuts consumed more, their gain was less and therefore the efficiency was less. However, the gain and efficiency rating of the birds in this portion of the trial did not differ significantly between processed and non-processed peanuts.

Summary of Trials

The above three trials indicate that the quality and utility of full-fat oilseed material is increased using the process of the present invention. The processed oilseeds exhibited reduced rumen protein degradation as well as having a positive effect on growth in young turkeys compared to unprocessed oilseeds.

Although the present invention has been described with reference to preferred embodiments, workers skilled in the art will recognize that changes may be made in form and detail without departing from the spirit and scope of the invention.

What is claimed is:

1. A process for treating a particulate full-fat oilseed, the oilseed material having at least approximately 10% fat content by weight and at least approximately 20% protein content by weight, comprising:
   mixing a lower alcohol with a proteinaceous oilseed material selected from the group consisting of rapeseed, cottonseed, peanuts and flaxseed, in a ratio that is at least approximately 9 pounds of alcohol to 60 pounds of oilseed material in a closed vessel such that the proteinaceous oilseed material/alcohol mixture is fluidized;
   introducing steam directly to the proteinaceous oilseed material/alcohol mixture to heat the material to a treatment temperature to a maximum of approximately 280° F. thereby vaporizing the alcohol such that the alcohol is placed in intimate contact with the oilseed material under superatmospheric pressure;
   stopping the steam flow to the proteinaceous oilseed material/alcohol mixture after the treatment temperature has been reached;
   holding the oilseed material/alcohol in a temperature range of approximately 190° F. to 280° F. without further introduction of steam in direct contact with the oilseed material and until the oilseed material reaches a PDI of approximately less than 10; and
   venting the lower alcohol vapors from the enclosed vessel only after the oilseed material has reached a PDI of approximately 10 to subatmospheric pressure while holding the temperature of the proteinaceous oilseed material above the boiling point of the lower alcohol at the subatmospheric pressure thereby removing substantially all of the lower alcohol from the proteinaceous oilseed material.

2. The process of claim 1 wherein the steam is introduced to the proteinaceous oilseed material/alcohol mixture until a treatment temperature of approximately 220° F. is reached.

3. The process of claim 2 wherein the proteinaceous oilseed material is held for approximately thirty minutes at approximately 220° F.

4. The process of claim 3 wherein the proteinaceous oilseed material is held for approximately thirty minutes at approximately 220° F. by introducing steam into a jacket of the closed vessel.

5. The process of claim 1 wherein the lower alcohol is substantially all ethanol.

6. The process of claim 1 wherein the lower alcohol is a mixture of 90% ethanol, 5% methanol and 5% water.

7. The process of claim 1 wherein the proteinaceous oilseed material is treated with lower alcohol vapors under a pressure range of 15 psi to 26 psi.

8. The process of claim 1 wherein the closed vessel is vented to a pressure range of approximately 25–26 inches Hg.

9. The process of claim 8 wherein the temperature of the proteinaceous oilseed material is kept at a maximum of 130° F. after venting until substantially all the alcohol vapor is removed from the oilseed material.

10. The process of claim 1 wherein the proteinaceous oilseed material is fluidized by a plurality of agitators located within the vessel.

* * * * *